Dec. 16, 1924.
F. L. BISHOP
METHOD OF MAKING CONDUITS
Filed Nov. 29, 1921
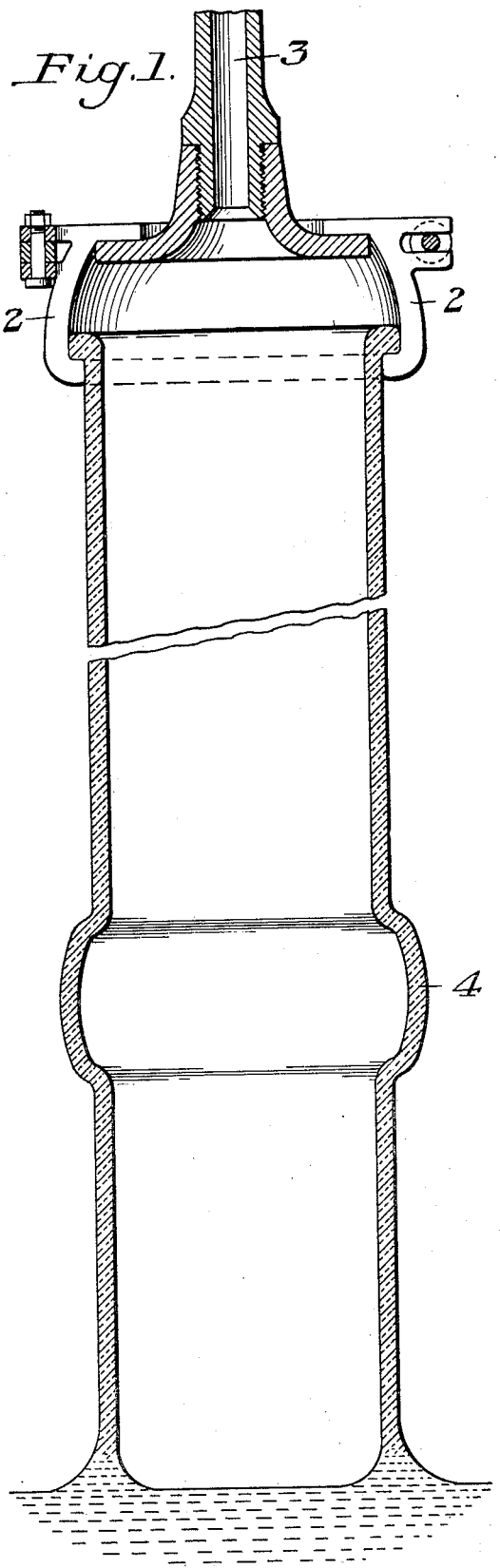
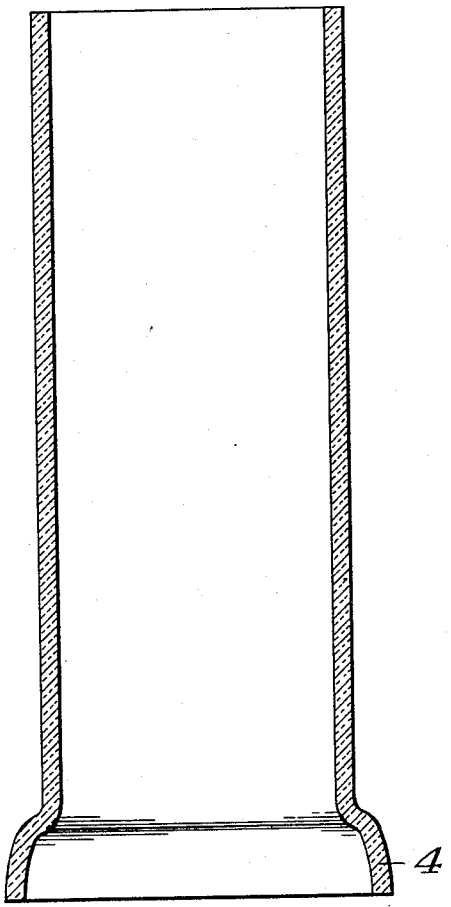
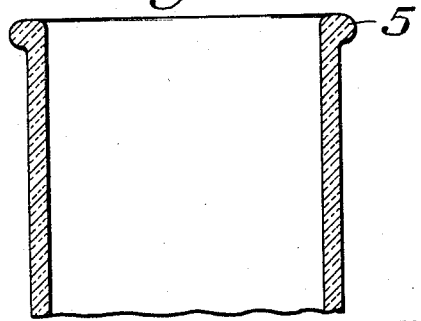
INVENTOR.

Patented Dec. 16, 1924.

1,519,658

UNITED STATES PATENT OFFICE.

FREDERIC L. BISHOP, OF PITTSBURGH, PENNSYLVANIA.

METHOD OF MAKING CONDUITS.

Application filed November 29, 1921. Serial No. 518,684.

*To all whom it may concern:*

Be it known that I, FREDERIC L. BISHOP, a citizen of the United States, residing at Pittsburgh, in the county of Allegheny and State of Pennsylvania, have invented a new and useful Improvement in Methods of Making Conduits, of which the following is a full, clear, and exact description, reference being had to the accompanying drawings, forming part of this specification, in which—

Figure 1 is a diagrammatic view illustrating one method for drawing glass conduits;

Figure 2 is a longitudinal section of one of the conduits; and

Figure 3 is a similar view showing a modified form of conduit.

My invention relates to self-supporting water and sewer conduits or pipes, which have hitherto been made of such materials as cast iron, steel, terracotta, concrete, reinforced concrete, etc.

I propose to make such conduits or pipes of glass, preferably by drawing one or more sections upwardly from a bath of molten glass while supplying air to the interior. The glass will be drawn of such thickness that it will have sufficient structural strength to be self-supporting and resistant to such strains as the conduit receives in transportation and in use. Preferably the sections of the conduit will each have a bell-shaped end, generally similar to that of ordinary sewer pipe.

In making this conduit according to the preferred method, a two-piece hinged bait 2, which is sufficiently cold to prevent welding of the glass thereto, is lowered into a bath of molten glass and air is supplied through the bait stem 3, as in the usual manner of drawing double thick window glass. The glass is, however, drawn more slowly, and the bath is maintained at such a temperature that the glass of the draw will be of sufficient thickness to be self-sustaining and resistant to the strains of use. After the desired length for one section has been drawn upwardly, the air pressure is increased so that near the bath the hollow glass article will be swelled out into a double dome or double bell shape, as shown at 4. The pressure is first increased and then gradually decreased to form this desired shape. The draw may then be continued for another length. The glass may then be thinned down and cracked off from the glass of the bath, or severed from the glass bath in any desirable manner.

When the article is taken down, it is "capped off" or cracked circumferentially at the center of the spherical enlargement. This gives two lengths straight at one end and having a bell at the other end. The thinned down portion at the lower end of one section may be cracked off, or this end may be slightly enlarged in the draw to fit the bell of the next length. The bait may have its interior ledge so shaped as to form a bead 5 at the straight end of the glass, as shown in Figure 3, to reinforce this end and fit in the bell of the next length.

The inside of each of the bells may have the glaze removed therefrom, and the surface thereof roughened to cause cement or other packing material to adhere thereto. The outside of the straight ends of the sections may be similarly treated for a distance substantially equal to the length of the bell, thereby enabling a tight joint to be easily made between the sections.

Again, I may draw a single length and enlarge the lower end by air pressure so as to form a help sphere or single bell. In this case, the length will have the bead at one end formed within a bait and the bell shape at the other end, the glass being cracked off or severed from the bath at the enlarged bell-shaped end.

The advantages of my invention will be apparent to those skilled in the art. The article is of superior quality for conducting liquids, such as water or sewage, since it is not attacked by any of the usual acids and the like, and its interior is smooth, thereby affording very small resistance to flow. Hence, accumulations will be much less liable to form on the interior, thus avoiding gradual clogging of the pipes and added resistance to flow. The finished conduit has greater mechanical strength and less weight than conduits of the same size as heretofore constructed. The pipes can be cheaply made, especially by the drawing process and are not affected by corrosive influences, but remain smooth and of low frictional resistance.

Instead of drawing each section with a bell-shaped end, I may draw sections for both ends bell-shaped and alternate these with straight sections having no bell at either end.

Other methods may be used for making these self-supporting glass conduits, the shape may be varied, and other changes may be made without departing from my invention.

I claim:

1. The method of forming a glass pipe, consisting in continuously drawing a hollow pipe upwardly from a glass bath with internal air pressure, enlarging the same to form a bell at one end, and roughening a portion of the pipe within the bell.

2. The method of forming a glass pipe, consisting in continuously drawing a comparatively straight pipe upwardly from a glass bath, increasing the air pressure to form an enlargement in the pipe, and then decreasing the air pressure while continuing the draw.

3. The method of forming a glass pipe, consisting in drawing a comparatively straight pipe upwardly from a glass bath, increasing the air pressure to form an enlargement therein, decreasing the air pressure, continuing the draw, and capping off the double length at the central portion of said enlargement.

4. The method of forming a glass pipe, consisting in drawing a comparatively straight pipe upwardly from a glass bath, increasing the air pressure, forming a double bell shaped enlargement therein, decreasing the air pressure, continuing the draw, and capping off the double length at the central portion of said enlargement.

5. The method of forming a glass pipe consisting in continuously drawing a comparatively straight pipe upwardly from a glass bath, increasing the air pressure, forming an elliptical or spherical enlargement, and then decreasing the air pressure while continuing the draw.

6. The method of forming a glass pipe, consisting in drawing a comparatively straight pipe upwardly from a glass bath, increasing the air pressure, forming an elliptical or spherical enlargement, decreasing the air pressure, continuing the draw, and capping off the double length at the central portion of the spherical enlargement.

In testimony whereof, I have hereunto set my hand.

FREDERIC L. BISHOP.